(12) United States Patent
Ke et al.

(10) Patent No.: US 11,907,637 B2
(45) Date of Patent: Feb. 20, 2024

(54) IMAGE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Lei Ke, Shenzhen (CN); Wenjie Pei, Shenzhen (CN); Ruiyu Li, Shenzhen (CN); Xiaoyong Shen, Shenzhen (CN); Yuwing Tai, Shenzhen (CN); Jiaya Jia, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 309 days.

(21) Appl. No.: 17/517,004

(22) Filed: Nov. 2, 2021

(65) Prior Publication Data
US 2022/0058332 A1 Feb. 24, 2022

Related U.S. Application Data

(63) Continuation of application No. PCT/CN2020/115559, filed on Sep. 16, 2020.

(30) Foreign Application Priority Data

Sep. 16, 2019 (CN) .......................... 201910872478.6

(51) Int. Cl.
*G06K 9/62* (2022.01)
*G06F 40/10* (2020.01)
(Continued)

(52) U.S. Cl.
CPC ............ *G06F 40/10* (2020.01); *G06F 18/214* (2023.01); *G06F 40/40* (2020.01); *G06V 10/50* (2022.01); *G06V 10/95* (2022.01)

(58) Field of Classification Search
CPC ........ G06F 40/10; G06F 18/214; G06F 40/40; G06F 40/30; G06F 18/02; G06V 10/50;
(Continued)

(56) References Cited

U.S. PATENT DOCUMENTS 11,314,982 B2 * 4/2022 Price ...................... G06N 3/045
2018/0373979 A1 12/2018 Wang et al.

FOREIGN PATENT DOCUMENTS

CN    109190619    1/2019
CN    110110145    8/2019
(Continued)

OTHER PUBLICATIONS

Chen et al. ("Microsoft COCO Captions: Data Collection and Evaluation Server", arXiv: 1504.00325v2 [cs.CV] Apr. 3, 2015) (Year: 2015).*

(Continued)

*Primary Examiner* — Duy M Dang
(74) *Attorney, Agent, or Firm* — Crowell & Moring LLP

(57) ABSTRACT

The present disclosure provides an image processing method and apparatus, and an electronic device, and relates to the field of artificial intelligence (AI). The method includes: obtaining an input image and extracting region features of image regions in the input image to obtain a first image feature; processing pixels in the first image feature according to a predetermined rule, and determining a second image feature according to the processed pixels; and determining, based on the second image feature and at least one word vector that is determined for the input image, word vectors corresponding to the region features of the image regions in the first image feature at different moments, predicting positions of the word vectors in a text description, and forming the text description corresponding to the input image according to the word vectors and the positions.

20 Claims, 8 Drawing Sheets

(51) Int. Cl.
*G06F 40/40* (2020.01)
*G06V 10/50* (2022.01)
*G06V 10/94* (2022.01)
*G06F 18/214* (2023.01)

(58) Field of Classification Search
CPC ........ G06V 10/09; G06V 10/82; G06V 10/40; G06V 10/70; G06V 30/10; G06V 30/1456; G06V 10/768; G06V 30/2272; G06V 30/262; G06V 30/268; G06V 30/274; G06T 3/4046; G06T 9/002; G06T 2207/20084; G06T 7/75; G06T 7/70
See application file for complete search history.

(56) References Cited

FOREIGN PATENT DOCUMENTS

| | | |
|---|---|---|
| CN | 110111399 | 8/2019 |
| CN | 110119754 | 8/2019 |
| CN | 110210499 | 9/2019 |
| CN | 110717498 | 1/2020 |
| JP | 2006-113776 | 4/2006 |
| JP | 2012-042990 | 3/2012 |
| JP | 2013-021482 | 1/2013 |
| JP | 2016-539664 | 12/2016 |
| JP | 2018-101317 | 6/2018 |
| JP | 2019-135636 | 8/2019 |
| WO | 2018/0170671 | 9/2018 |

OTHER PUBLICATIONS

English translation of International Search Report dated Dec. 23, 2020 in International Application No. PCT/CN2020/115559.

Liu, Yu, Design and Implementation of Image Captioning Model Based on Deep Learning, Information and Technology, China Master's Theses Full-Text Database, Jan. 15, 2019, sections 3.4.4 and 4.4.1

Japanese Decision to Grant a Patent dated Sep. 6, 2022 in corresponding Japanese Patent Application No. 2021-564175 with English translation.

* cited by examiner

IMAGE PROCESSING METHOD AND APPARATUS, AND STORAGE MEDIUM

RELATED APPLICATION

This application is a continuation application of PCT Patent Application No. PCT/CN2020/115559, filed on Sep. 16, 2020, which claims priority to Chinese Patent Application No. 201910872478.6, entitled "IMAGE DESCRIPTION GENERATION METHOD AND APPARATUS, AND ELECTRONIC DEVICE", and filed with the China National Intellectual Property Administration on Sep. 16, 2019, wherein the content of each of the above-referenced applications is incorporated herein by reference in its entirety.

FIELD OF THE TECHNOLOGY

The present disclosure relates to the field of artificial intelligence (AI) technologies, and specifically, to an image processing method, an image description generation apparatus, and an electronic device.

BACKGROUND OF THE DISCLOSURE

Image description generation is an analytical research of generating, for a picture, a natural language description that can express meanings of the picture, and has a wide application prospect. For example, a person with visual impairment may be helped to quickly and accurately understand image content by generating a text description of a picture; and in the preschool education field, better enlightenment may be provided to children by generating intuitive and accurate descriptions of pictures for the children.

Inspired by successful applications of neural networks in image recognition and machine translation, many existing methods all generate image text descriptions based on a neural network model. Currently, the image description generation mainly encodes an image into a fixed vector expression using a convolutional neural network, and then directly decodes, using a recurrent neural network, the fixed vector expression into a sentence describing content. However, an existing decoding model is relatively simple, and consequently an effect of the model declines apparently when a sentence is relatively long or a sentence structure is relatively complex.

The information disclosed in the above background part is used only for enhancing the understanding of the background of the present disclosure, and therefore may include information that dues not constitute the related art known to a person of ordinary skill in the art.

SUMMARY

Embodiments of the present disclosure provide an image processing method, an image processing apparatus, and an electronic device, so that natural language information included in an image may be at least accurately and effectively extracted to some extent, and a more accurate and fluent text description is generated.

Other characteristics and advantages of the present disclosure become apparent from the following detailed description, or may be learned in part through the practice of the present disclosure.

According to one aspect of the embodiments of the present disclosure, an image processing method performed by a computing device is provided. The method may include obtaining an input image and extracting region features of image regions in the input image to obtain a first image feature. The method may further include processing pixels in the first image feature according to a predetermined rule and determining a second image feature according to the processed pixels. The method may further include determining, based on the second image feature and at least one word vector that is determined for the input image, word vectors corresponding to the region features of the image regions in the first image feature at different moments. The method may further include predicting positions of the word vectors in a text description and forming the text description corresponding to the input image according to the word vectors and the positions.

According to another aspect of the embodiments of the present disclosure, an image processing apparatus is provided. The apparatus may include a memory operable to store computer-readable instructions and a processor operable to read the computer-readable instructions. When executing the computer-readable instructions, the processor may be configured to obtain an input image and extract region features of image regions in the input image to obtain a first image feature. The processor may be further configured to process pixels in the first image feature according to a predetermined rule and determine a second image feature according to the processed pixels. The processor may be further configured to determine, based on the second image feature and at least one word vector that is determined for the input image, word vectors corresponding to the region features of the image regions in the first image feature at different moments. The processor may be further configured to predict positions of the word vectors in a text description and form the text description corresponding to the input image according to the word vectors and the positions.

According to another aspect of the embodiments of the present disclosure, a non-transitory computer-readable storage medium is provided. The storage medium may have processor executable instructions stored thereon. The instructions may cause a processor to obtain an input image and extract region features of image regions in the input image to obtain a first image feature. The instructions may further cause the processor to process pixels in the first image feature according to a predetermined rule and determine a second image feature according to the processed pixels. The instructions may further cause the processor to determine, based on the second image feature and at least one word vector that is determined for the input image, word vectors corresponding to the region features of the image regions in the first image feature at different moments. The instructions may further cause the processor to predict positions of the word vectors in a text description and form the text description corresponding to the input image according to the word vectors and the positions.

In the technical solutions of the present disclosure, image features corresponding to the input image are decoded using a decoding network model, so that on the one hand, natural language information included in the input image may be extracted more accurately and effectively, and on the other hand, the decoding network model is also applicable when a sentence is relatively long or a sentence structure is relatively complex, thereby improving the accuracy and fluency of text descriptions.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. Apparently, the accompanying drawings in the following description show merely some embodiments of the present disclosure, and a person of ordinary skill in the art may still derive other accompanying drawings from these accompanying drawings without creative efforts. In the accompanying drawings.

DESCRIPTION OF EMBODIMENTS

Exemplary implementations will now be described more thoroughly with reference to the accompanying drawings. However, the exemplary implementations can be implemented in various forms and are not to be construed as being limited to the examples set forth herein. Rather, the implementations are provided so that the present disclosure can be more comprehensive and complete, and the concepts of the exemplary implementations are fully conveyed to a person skilled in the art.

In addition, the described features, structures, or characteristics may be combined in one or more embodiments in any appropriate manner. In the following descriptions, many specific details are provided to obtain a thorough understanding of the embodiments of the present disclosure. However, a person skilled in the art is to be aware that, the technical solutions of the present disclosure may be implemented without one or more specific details, or another method, component, apparatus, step, and the like may be used. In other cases, well-known methods, apparatuses, implementations, or operations are not shown or described in detail to avoid obscuring aspects of the present disclosure.

The block diagrams shown in the accompanying drawings are merely functional entities and do not necessarily correspond to physically independent entities. The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
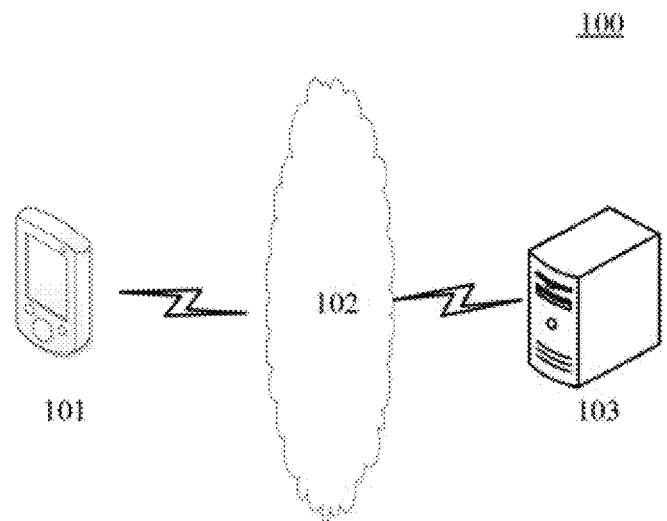
FIG. 1 is a schematic diagram of an exemplary system architecture to which a technical solution according to an embodiment of the present disclosure is applicable.

FIG. 1 is a schematic diagram of an exemplary system architecture to which a technical solution according to an embodiment of the present disclosure is applicable.

As shown in FIG. 1, a system architecture 100 may include a terminal device 101, a network 102, and a server 103. The network 102 is configured to provide a medium of a communication Link between the terminal device 101 and the server 103. The network 102 may include various connection types, for example, a wired communication link and a wireless communication link.

It is to be understood that the quantities of terminal devices, networks, and servers in FIG. 1 are merely exemplary. There may be any quantities of terminal devices, networks, and servers according to an actual requirement. For example, the server 103 may be a server cluster including a plurality of servers.

In an embodiment of the present disclosure, the terminal device 101 transmits an image to the server 103 through the network 102. After obtaining the input image, the server 103 may first divide the input image to form a plurality of image regions, perform feature extraction on objects in the image regions using an encoding network model to obtain region features corresponding to the image regions, and then obtain a first image feature corresponding to the input image according to the region features corresponding to the image regions. Then, the server processes pixels in the first image feature according to a predetermined rule, and determines a second image feature corresponding to the input image according to the processed pixels. The server then inputs the first image feature, the second image feature, and an initial word vector into a reflective decoding network model, decodes the first image feature using the reflective decoding network model to obtain word vectors corresponding to the image regions, and then forms a text description corresponding to the input image according to the word vectors corresponding to the image regions. The technical solution of this embodiment of the present disclosure can ensure the performance of a model when a sentence is relatively long or a sentence structure is relatively complex, further extract natural language information included in an image more accurately and effectively, and generate a more accurate and fluent text description.

The image processing method provided in the embodiments of the present disclosure is generally performed by a server, and correspondingly, an image processing apparatus is generally disposed in the server. However, in other embodiments or the present disclosure, the image processing method provided in the embodiments of the present disclosure may be alternatively performed by a terminal device.

Figure 2:
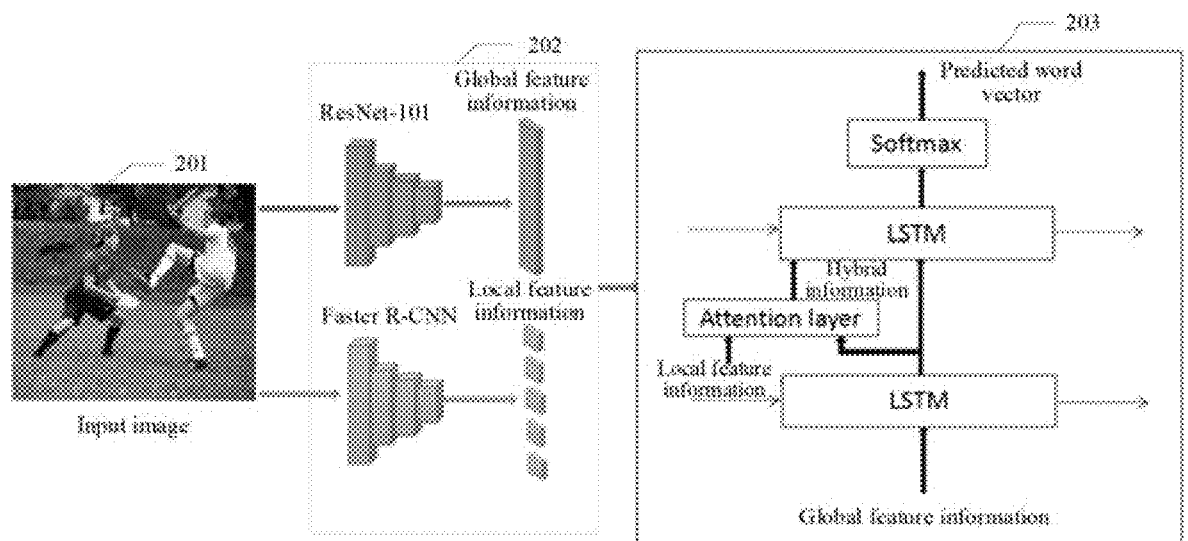
FIG. 2 is a schematic flowchart of an image processing method in the related art.

In the related art in this field, a text description of an image is mainly generated using an encoder-decoder framework. FIG. 2 is a schematic flowchart of an image processing method in the related art. As shown in FIG. 2, an image 201 is inputted into an encoding network model 202, where the encoding network model 202 includes a Faster Region Based Convolutional Neural Networks (R-CNN) network and a Residual Neural Network-101 (ResNet-101) network, local feature information corresponding to objects in the input image may be obtained by performing feature extraction on the input image using the Faster R-CNN network, and global feature information corresponding to the input image may be obtained by performing feature extraction on the input image using the ResNet-101 network; and the local feature information and the global feature information are then inputted into a decoding network model 203. The decoding network model 203 includes a plurality of repeated network structures, and the network structure is an attention-based recurrent neural network. Specifically, the global feature information is inputted into a first layer of long short-term memory (LSTM), and feature extraction is performed on the global feature information using the first layer of LSTM, to output a first hidden state; the first hidden state and the local feature information are then inputted into an attention mechanism network layer, to output a hybrid feature using the attention mechanism network layer; the hybrid feature and the first hidden state are then processed jointly using a second layer of LSTM, to output a second hidden state; and softmax processing is finally performed on the second hidden state, to obtain a predicted word vector.

Although an image description generation algorithm shown in FIG. 2 can obtain a better effect, the algorithm still has limitations. Specifically, a method for improving the model effect can be only implemented by extracting more representative image features whose fine granularity is segmented to a single object, and attention on a language model is ignored. The decoding network model is relatively simple, and consequently an effect of the model declines apparently when a sentence is relatively long or a sentence structure is relatively complex.

The embodiments of the present disclosure provide an image processing method. The image processing method relates to the field of artificial intelligence (AI), where AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

The CV technology is a technology that studies how to use a machine to "see", and furthermore, that uses a camera and a computer to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

The ML is a multi-field interdiscipline, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

With the research and progress of the AI technology, the AI technology is studied and applied to a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

Figure 3:
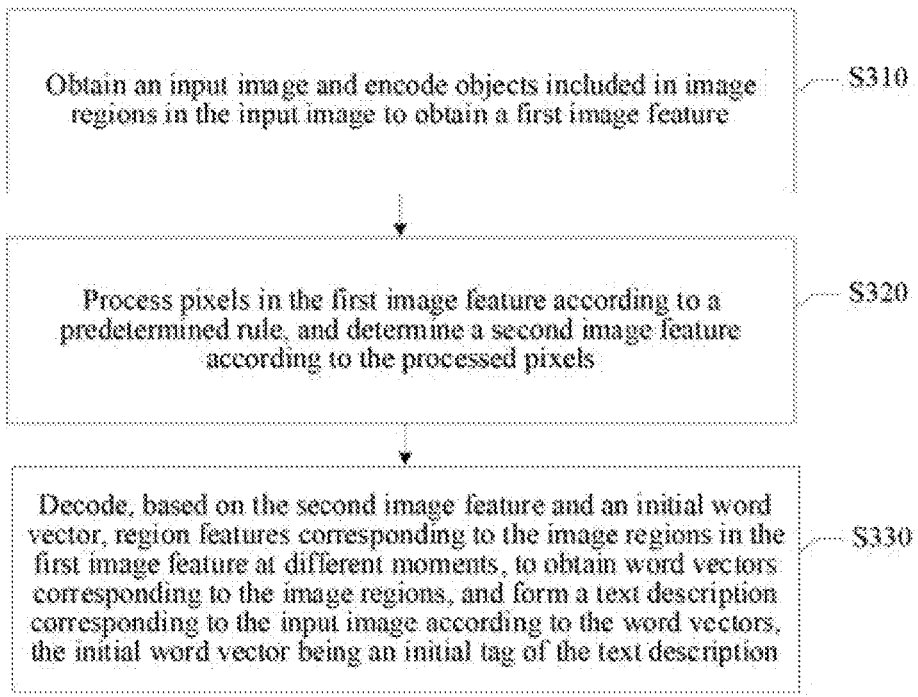
FIG. 3 is a schematic flowchart of an image processing method according to an embodiment of the present disclosure.

The solutions provided in the embodiments of the present disclosure relate to the image semantic understanding technology of AI, and are specifically described using the following embodiments:

An embodiment of the present disclosure first provides an image processing method, the image processing method is applicable to fields such as early childhood education, image retrieval, and navigation for a blind person, and implementation details of the technical solution of this embodiment of the present disclosure are described in detail below:

FIG. 3 is a flowchart of an image processing method according to an embodiment of the present disclosure. The image processing method may be performed by one or more computing devices, and the one or more computing devices may be the terminal device 101 and/or server 103 shown in FIG. 1. Referring to FIG. 3, the image processing method includes at least steps S310 to S330.

Step S310: Obtain an input image and encode objects included in image regions in the input image to obtain a first image feature.

In an embodiment of the present disclosure, the input image may be an image downloaded from a network, an image locally stored in the terminal device 101, or an image obtained by a user using a photographing apparatus, for example, a terminal including a photographing unit, such as a camera, a video camera, or a smartphone. After an image for which a text description needs to be generated is determined, the image may be transmitted to the server 103 using the terminal device 101. Further, the terminal device lot may be any terminal device including a display screen, such as a smartphone, a notebook computer, or a desktop computer, and is not specifically limited in the embodiments of the present disclosure.

In an embodiment of the present disclosure, after an input image is received, the input image may be divided to form a plurality of image regions, where a method for dividing the input image may be dividing the input image according to a quantity of pixels, or may be dividing the input image according to different objects in the image. After the plurality of image regions are formed by dividing the input image, encoding, that is, feature extraction may be performed on objects in the image regions. For example, a scene represented by an image is a child bouncing a ball in a yard, objects in the image are the child, the ball, and the grassland, while the background such as the sky and birds in the image may be ignored, and there is no need to perform feature extraction on the background. When the objects in the image regions are encoded, network structures such as Faster R-CNN, ResNet, and Visual Geometry Group (VGG) may be used as an encoding network model, and feature extraction is performed on the objects in the image regions using the encoding network model, to obtain region features corresponding to the image regions, where the region feature is essentially a fixed vector expression corresponding to an image region. Further, a first image feature corresponding to the input image may be obtained according to the region features corresponding to the image regions.

Step S320: Process pixels in the first image feature according to a predetermined rule, and determine a second image feature according to the processed pixels.

In an embodiment of the present disclosure, after the first image feature is obtained by performing feature extraction on the image regions in the input image, pixel values in the second image feature may be determined according to pixel values of the pixels in the first image feature. Specifically, a pixel average value of all pixels in the first image feature may be calculated, and the pixel average value is used as a pixel value of each pixel in the second image feature. The second image feature may be used as an input feature and inputted into a reflective decoding network model, to cause the reflective decoding network model to decode the first image feature according to the second image feature and an initial word vector, to predict word vectors corresponding to the image regions in the first image feature. The initial word vector in the embodiments of the present disclosure may be any character without actual semantics. For example, the initial word vector may be an initial tag such as #, or may be an initial token word such as BN, and is not specifically limited in the embodiments of the present disclosure.

Step S330: Decode, based on the second image feature and an initial word vector, region features corresponding to the image regions in the first image feature, to obtain word vectors corresponding to the image regions, and form a text description corresponding to the input image according to the word vectors, the initial word vector being an initial tag of the text description.

In step S330, the region features corresponding to the image regions in the first image feature may be decoded at different moments, and a current region feature may be decoded using a region feature that has been decoded before.

In an embodiment of the present disclosure, after the second image feature is obtained, the second image feature is used as an input feature and inputted into the reflective decoding network model, and the initial word vector may be also inputted into the reflective decoding network model simultaneously, to cause the reflective decoding network model to decode the region features corresponding to the image regions in the first image feature at different moments, to obtain the word vectors corresponding to the image regions.

Figure 4:
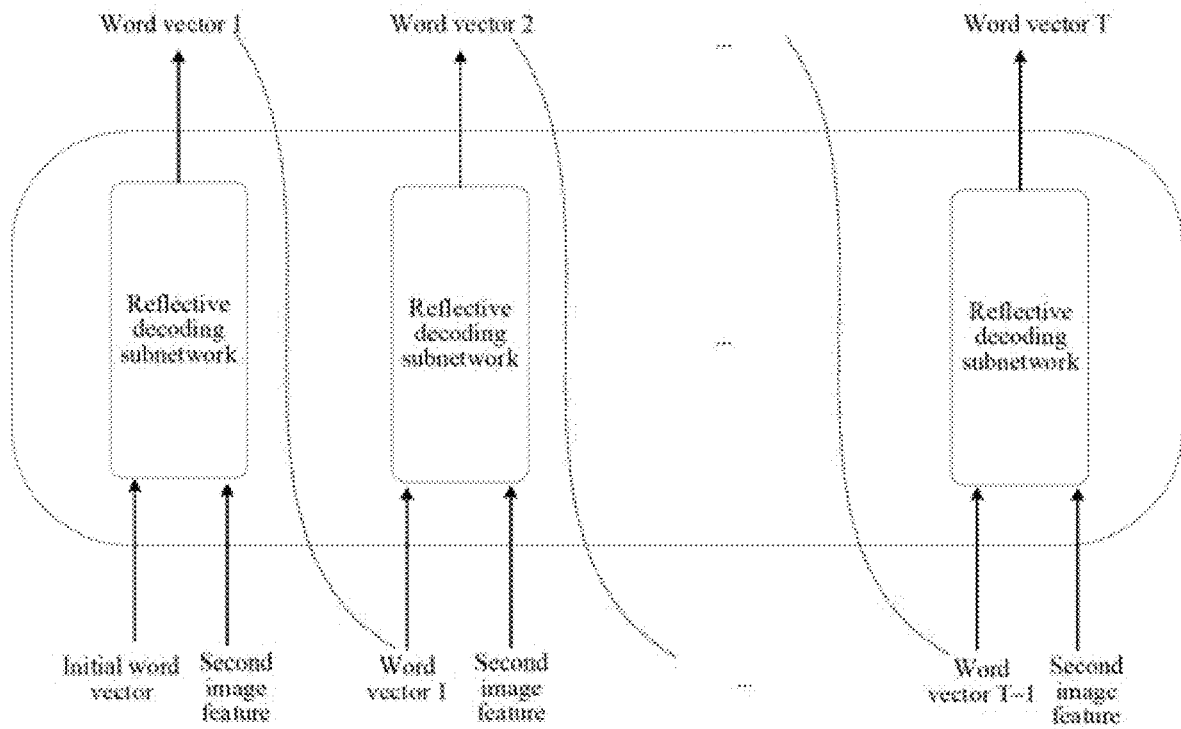
FIG. 4 is a schematic structural diagram of a reflective decoding network model according to an embodiment of the present disclosure.

FIG. 4 is a schematic structural diagram of a reflective decoding network model. As shown in FIG. 4, the reflective decoding network model includes a plurality of reflective decoding subnetworks arranged sequentially, where the reflective decoding subnetworks decode region features corresponding to image regions in a first image feature respectively at different moments, to obtain word vectors corresponding to the image regions. For a first reflective decoding subnetwork, the second image feature and the initial word vector may be used as input features and inputted into the first reflective decoding subnetwork, and a target region feature in the first image feature is decoded based on the second image feature and the initial word vector using the first reflective decoding subnetwork, to obtain a word vector corresponding to the target region feature. For an $(M+1)^{th}$ reflective decoding subnetwork, the second image feature and a word vector that is outputted by an $M^{th}$ reflective decoding subnetwork may be inputted into the $(M+1)^{th}$ reflective decoding subnetwork, and the target region feature in the first image feature is decoded using the $(M+1)^{th}$ reflective decoding subnetwork, to obtain a word vector corresponding to the target region feature, where M is a positive integer.

The method of this embodiments of the present disclosure may include:

obtaining an input image and extracting region features of image regions in the input image to obtain a first image feature;

processing pixels in the first image feature according to a predetermined rule, and determining a second image feature according to the processed pixels; and determining, based on the second image feature and at least one word vector that is determined for the input image, word vectors corresponding to the region features of the image regions in the first image feature at different moments, predicting positions of the word vectors in a text description, and forming the text description corresponding to the input image according to the word vectors and the positions.

In an embodiment of the present disclosure, structures of the reflective decoding subnetworks are the same, and each reflective decoding subnetwork includes three parts: a visual attention module, a reflective attention module (RAM), and a reflective position module (RPM). The visual attention module mainly focuses on visual features of an encoding network model. The reflective attention module models, based on output information of the visual attention module, a degree of matching between the output information of the visual attention module at a current moment and the output information of the visual attention module at past moments using a text attention mechanism to obtain a context vector, to generate a word at the current moment, so as to capture more comprehensive historical word information. The reflective position module may introduce relative position information of each word in a generated text description, and predict a relative position of a current word in the text description when the reflective decoding network model predicts a word, to help the reflective decoding network model to perceive a syntactic structure of a sentence.

Figure 5:
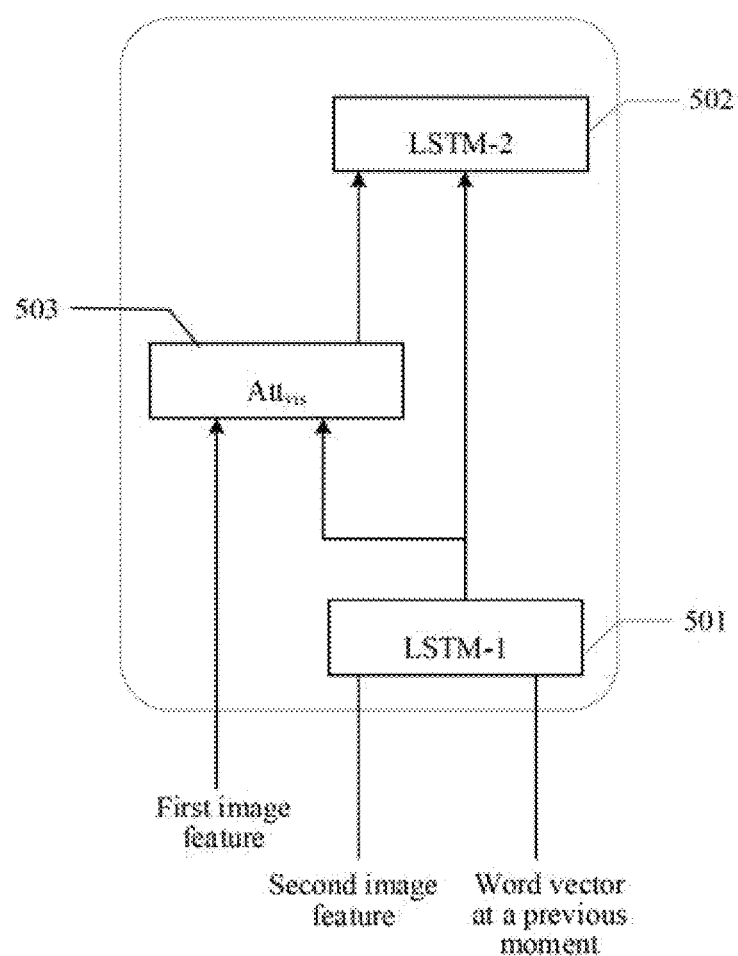
FIG. 5 is a schematic structural diagram of a visual attention module according to an embodiment of the present disclosure.

FIG. 5 is a schematic structural diagram of a visual attention module. As shown in FIG. 5, the visual attention module 500 includes a first LSTM network (LSTM-1) 501, a second LSTM network (LSTM-2) 502, and an attention mechanism network ($Att_{vis}$) 503, where the first LSTM network 501 is configured to perform feature extraction according to a second image feature and a word vector that is obtained at a previous moment, the second LSTM network 502 is configured to perform feature extraction according to output information of the first LSTM network 501 and output information of the attention mechanism network 503, and the attention mechanism network 503 is configured to perform feature extraction according to a first image feature and the output information of the first LSTM network 501.

Figure 6:
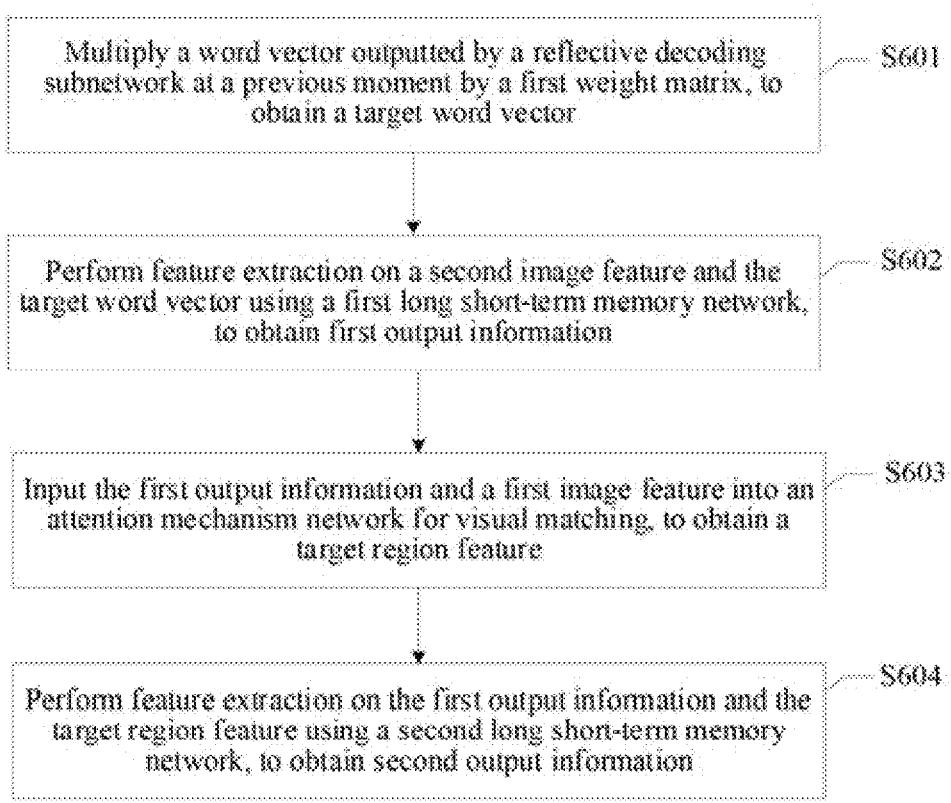
FIG. 6 is a schematic diagram of a processing procedure of a visual attention module according to an embodiment of the present disclosure.

Further, FIG. 6 is a schematic diagram of a processing procedure of a visual attention module. For ease of understanding, a description is made using a processing procedure of a visual attention module in a $t^{th}$ reflective decoding subnetwork as an example in an embodiment of the present disclosure. As shown in FIG. 6, the processing procedure of the visual attention module includes at least steps S601 to S604, specifically:

Step S601: Multiply a word vector outputted by a reflective decoding subnetwork at a previous moment by a first weight matrix, to obtain a target word vector.

Figure 7:
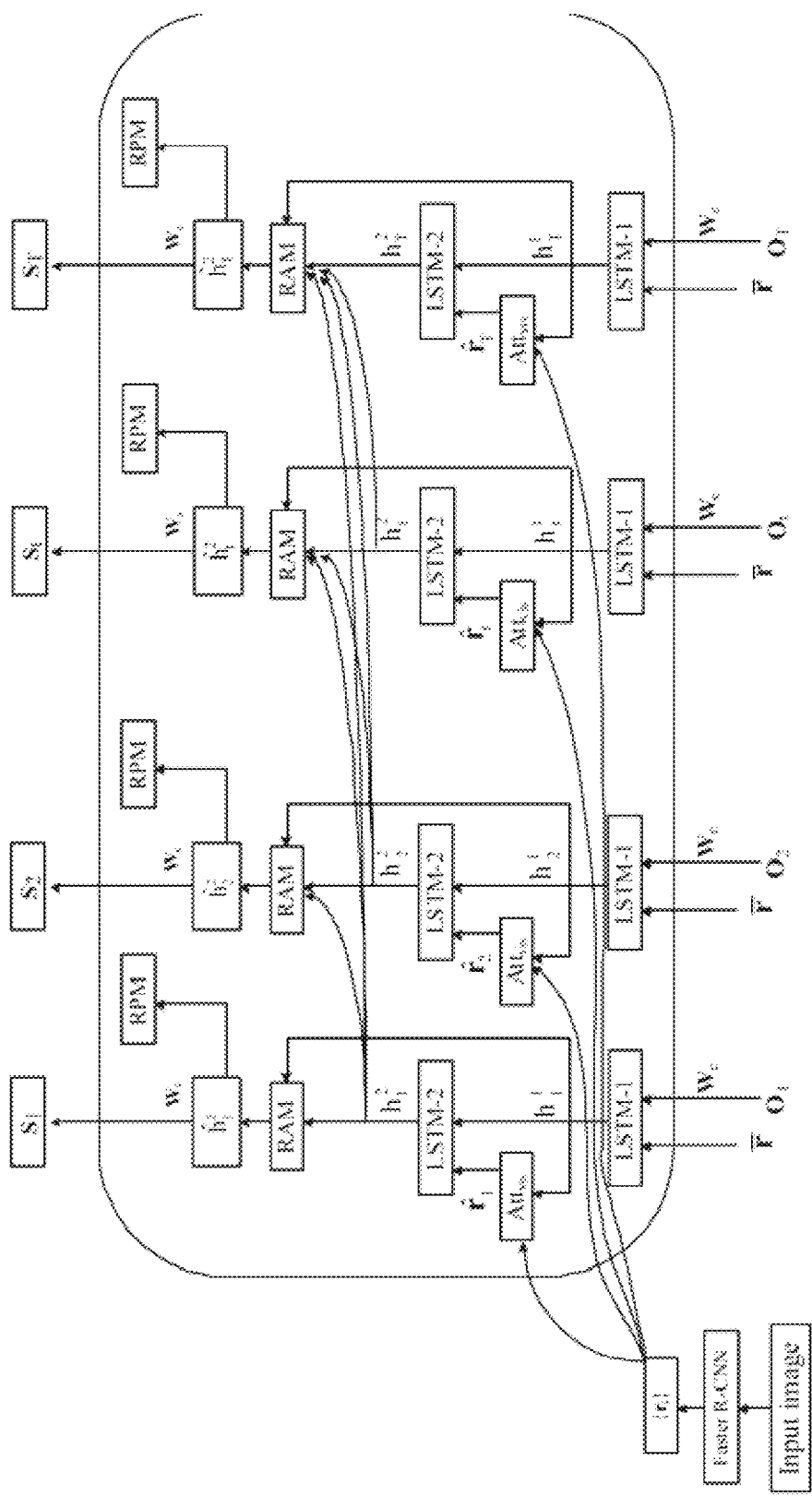
FIG. 7 is a schematic flowchart of image processing according to an embodiment of the present disclosure.

In an embodiment of the present disclosure, FIG. 7 is a schematic flowchart of image processing. As shown in FIG. 7, for an LSTM-1, the second image feature $\bar{r}$ determined according to the first image feature and a word vector outputted by a reflective decoding subnetwork at a previous moment are input features of the LSTM-1. To ensure that dimensions of the inputted word vector and dimensions of data processed by the LSTM-1 are the same, dimension adjustment may be performed on an input word vector feature of each reflective decoding subnetwork. Specifically, an input word vector feature $O_t$ (t=1, ..., T) may be multiplied by a first weight matrix $W_e$, to obtain a target word vector, so as to change dimensions of the input feature $O_t$. The first weight matrix $W_e$ is shared by each input feature $O_t$, so that only one parameter needs to be trained for the first weight matrix $W_e$ during model training.

Step S602: Perform feature extraction on the second image feature and the target word vector using the first LSTM network, to obtain first output information.

In an embodiment of the present disclosure, after the second image feature and the target word vector are inputted into the LSTM-1, the LSTM-1 processes the target word vector and the second image feature to output first output information, where the first output information is essentially a hidden state outputted by the LSTM-1 and is $h_1^1$ shown in FIG. 7.

Step S603: Input the first output information and the first image feature into the attention mechanism network for visual matching, to obtain a target region feature.

In an embodiment of the present disclosure, an attention mechanism is similar to human vision, which can selectively focus on a part or all information and ignore other visible information simultaneously. Before decoding is performed using a reflective decoding network model, a convolutional neural network such as Faster R-CNN may be used to perform feature extraction on the input image to obtain a first image feature $\{r_i\}$ (i=1, ..., k). Then, after the first output information outputted by the LSTM-1 is obtained, the first output information and the first image feature may be inputted into the attention mechanism network simultaneously, and visual matching is performed between the first output information and the first image feature using the attention mechanism network $Att_{vis}$, to determine a degree of matching between each region feature in the first image feature and the first output information, and a region feature with the highest matching degree, $\hat{r}_1$ shown in FIG. 7, is finally outputted as a target region feature from the attention mechanism network.

Step S604: Perform feature extraction on the first output information and the target region feature using the second LSTM network, to obtain second output information.

In an embodiment of the present disclosure, after the target region feature is obtained, the target region feature and the first output information are used as input features and inputted into the LSTM-2. The LSTM-2 may perform feature extraction on the first output information and the target region feature, to obtain second output information corresponding to the target region feature. The second output information is a hidden state outputted by the LSTM-2 and is $h_1^2$ shown in FIG. 7. The LSTM in the embodiments of the present disclosure may be alternatively replaced with another recurrent neural network, and further, the LSTM-1 and LSTM-2 in the embodiments of the present disclosure may be replaced with different types of recurrent neural networks. However, the LSTM is a time recursive neural network and is suitable for processing and predicting important events with a relatively long interval and latency in a time sequence. Therefore, to predict words more accurately and form a coherent text description, the image processing method in the embodiments of the present disclosure predicts words by mainly using the LSTM.

Afterward, in some embodiments, a word vector corresponding to the target region feature may be determined according to the first hidden state and the second hidden state.

In an embodiment of the present disclosure, when a sentence is relatively long or a sentence structure is relatively complex, to improve a decoding effect, this embodiment of the present disclosure first proposes that the reflective attention module is used to perform matching between a hidden state at a current moment and hidden states at past moments using the text attention mechanism. As shown in FIG. 7, a reflective attention module (RAM) in a $t^{th}$ reflective decoding subnetwork further receives second output information outputted by an LSTM-2 in a first reflective decoding subnetwork to an LSTM-2 in a $(t-1)^{th}$ reflective decoding subnetwork and first output information outputted by an LSTM-1 corresponding to the RAM in addition to receiving second output information outputted by an LSTM-2 corresponding to the RAM, to determine third output information corresponding to the target region feature at the current moment according to the second output information at the past moments and the first output information and the second output information at the current moment.

Figure 8:
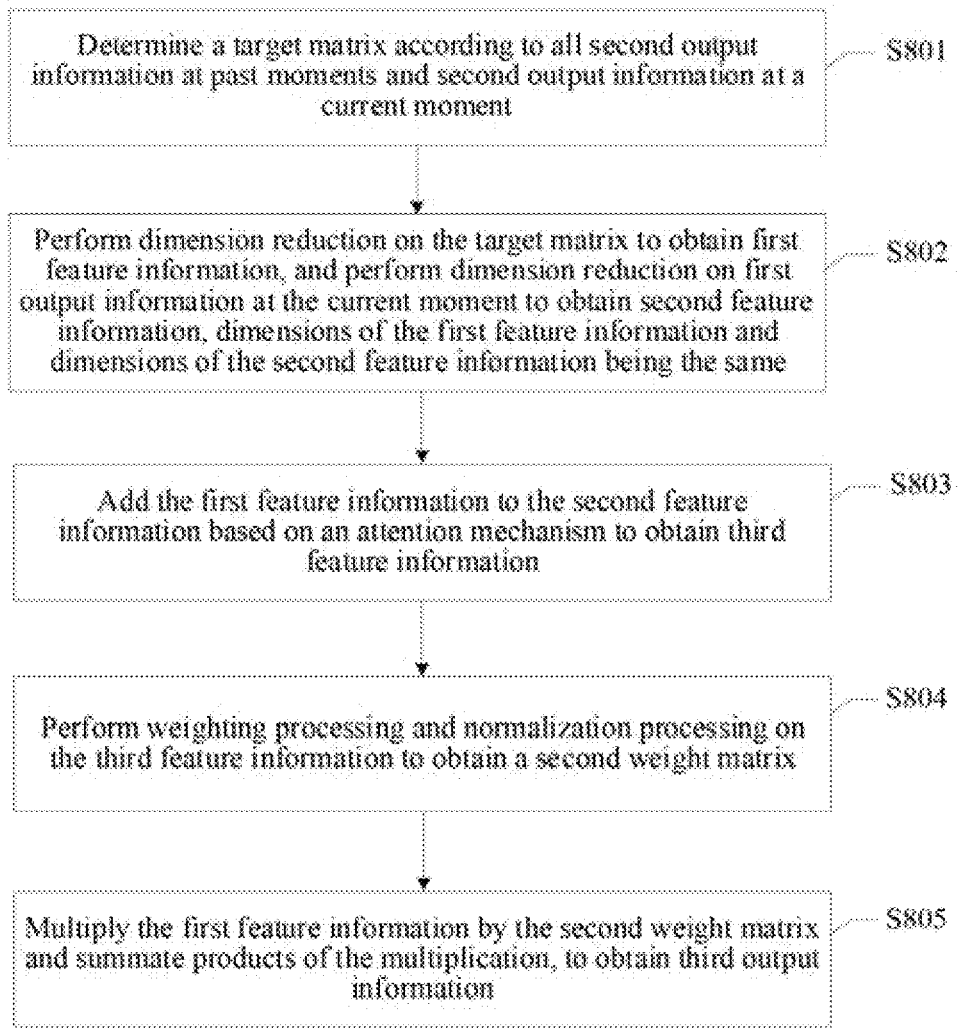
FIG. 8 is a schematic diagram of a processing procedure of a reflective attention module according to an embodiment of the present disclosure.

FIG. 8 is a schematic diagram of a processing procedure of a reflective attention module. As shown in FIG. 8, the processing procedure includes at least steps S801 to S805, specifically:

Step S801: Determine a target matrix according to all second output information at past moments and second output information at a current moment.

Figure 9:
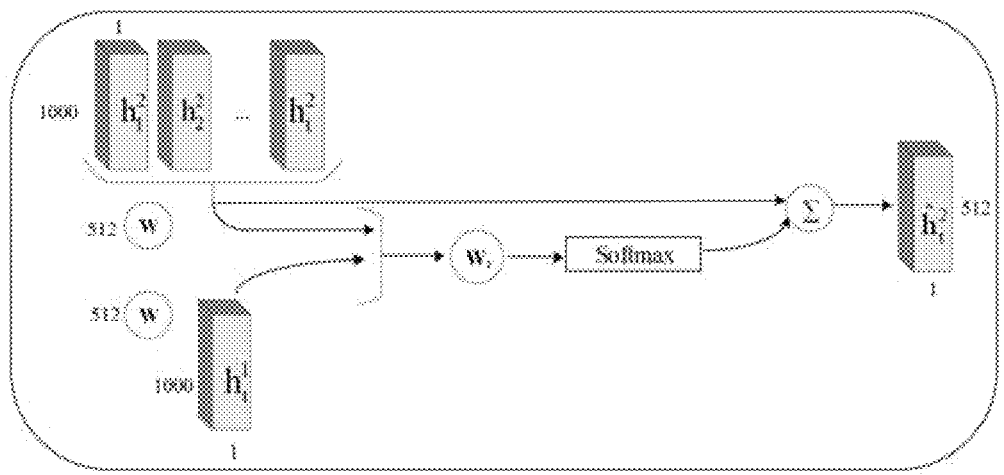
FIG. 9 is a schematic structural diagram of a reflective attention module according to an embodiment of the present disclosure.

In an embodiment of the present disclosure, FIG. 9 shows a schematic structural diagram of a reflective attention module. As shown in FIG. 9, cylinders at the top left corner represent second output information, and a target matrix having corresponding dimensions, for example, a 1000×1 target matrix may be formed according to the second output information $h_1^2, h_2^2, \ldots,$ and $h_{t+1}^2$ at the past moments and the second output information $h_1^2$ at the current moment.

Step S802: Perform dimension reduction on the target matrix to obtain first feature information, and perform dimension reduction on first output information at the current moment to obtain second feature information, dimensions of the first feature information and dimensions of the second feature information being the same.

In an embodiment of the present disclosure, to improve the calculation efficiency, dimension reduction may be performed on the target matrix and the first output information at the current moment, to respectively obtain the first feature information and the second feature information having the same dimensions. As shown in FIG. 9, the target matrix and the first output information at the current moment may be each multiplied by a 512-dimensional weight matrix, to reduce dimensions of the target matrix and dimensions of the first output information from 1000 dimensions to 512 dimensions, thereby greatly improving the processing efficiency.

Step S803: Add the first feature information to the second feature information based on an attention mechanism to obtain third feature information.

In an embodiment of the present disclosure, based on the text attention mechanism, the first feature information and the second feature information may be correspondingly processed as Attref shown in FIG. 9. Specifically, the first feature information and the second feature information may be added, and certainly, other specific processing manners may be alternatively used. This is not specifically limited in the embodiments of the present disclosure. After the first feature information and the second feature information are added, third feature information combining the hidden states at the past moments and the hidden state at the current moment may be obtained.

Step S804: Perform weighting processing and normalization processing on the third feature information to obtain a second weight matrix.

In an embodiment of the present disclosure, after the third feature information is obtained, the third feature information may be multiplied by a reflective attention weight $W_r$ to obtain a feature matrix, where a quantity of information included in the feature matrix and a quantity of second output information in the target matrix are the same and are both t; and softmax processing, namely, normalization processing may be then performed on the feature matrix to calculate a ratio of each piece of information to all the information, and a second weight matrix may be determined according to a ratio corresponding to each piece of second output information.

Step S805: Multiply the first feature information by the second weight matrix and summate products of the multiplication, to obtain third output information.

In an embodiment of the present disclosure, after the second weight matrix including the ratios corresponding to all the second output information is obtained, the first feature information determined according to all the second output information may be multiplied by the second weight matrix and products of the multiplication may be summated, to obtain the third output information, namely, a right cylinder $\hat{h}_t^2$ shown in FIG. 9.

In an embodiment of the present disclosure, after the third output information outputted by the reflective attention module is obtained, the third output information may be multiplied by a third weight matrix $W_s$ to obtain a word vector corresponding to the target region feature $\hat{r}_t$, such as $S_t$ shown in FIG. 7. The word vector $S_t$ outputted at a moment t is an input vector $O_{t+1}$ at a moment t+1.

In an embodiment of the present disclosure, as shown in FIG. 7, after the reflective attention module outputs the third output information, the third output information may be inputted into the reflective position module simultaneously, and the reflective position module may predict a relative position of a word vector outputted at the current moment in the text description according to the third output information. Specifically, the reflective position module includes a fully connected layer and a compression layer. After the third output information is inputted into the reflective position module, full connection is first performed through the fully connected layer, to convert the 512×1 dimensional $\hat{h}_t^2$ into a 1×1 dimensional vector, and the vector outputted by the fully connected layer is then compressed through the compression layer according to a corresponding compression function, to obtain a relative position. A result outputted by the compression layer is a number between 0 and 1, which represents a position of the word vector in the text description. For example, if the text description is a sentence including 10 words, and the number outputted by the compression layer is 0.6, the position of the word vector $S_t$ outputted by the $t^{th}$ reflective decoding subnetwork in the sentence is a sixth position.

In an embodiment of the present disclosure, the region features corresponding to the image regions in the first image feature are decoded using the plurality of reflective decoding subnetworks arranged sequentially in the reflective decoding network model, generation of word vectors is stopped after a punctuation at a sentence end is encountered, and after word vectors $S_1, S_2, \ldots, S_T$) corresponding to the image regions are obtained, these word vectors may be connected in series sequentially to form the text description corresponding to the input image.

In an embodiment of the present disclosure, before the text description is generated by performing word prediction on the first image feature using the reflective decoding network model, the reflective decoding network model further needs to be trained. Specifically, an image sample and a text description sample corresponding to the image sample are first obtained, the image sample is then inputted into a reflective decoding network model to generate a corresponding text description, and model parameters are adjusted according to a degree of matching between the generated text description and the corresponding text description sample until a loss function of the reflective decoding network model is minimized. In the embodiments of the present disclosure, the loss function of the reflective decoding network model includes two parts: a cross entropy loss function and a position-perceptive loss function, where the cross entropy loss function is a correct probability of a text description generated by the reflective decoding network model and corresponding to the image sample; and the position-perceptive loss function is a distance between a real position and a predicted position of a word vector outputted by the reflective decoding network model at a current moment in the text description sample.

In an embodiment of the present disclosure, to minimize the loss function of the reflective decoding network model, it needs to be ensured that the cross entropy loss function is maximized and the position-perceptive loss function is minimized, where the cross entropy loss function may be determined according to formula (1), specifically:

$$\theta = \arg\max_{\theta} \sum_{(I,S)} \log p(S \mid I; \theta), \tag{1}$$

where I is the input image; θ is a parameter of the reflective decoding network model and includes the weight matrices $W_e$, $W_s$, and $W_t$ in the foregoing embodiments; and S is a correct unfixed-length text description corresponding to the input image and can represent any sentence.

Any word vector in the text description S depends on a previous word vector adjacent to the any word vector, so that a modeling representation may be made, using a chain rule, on a joint probability distribution of word vectors $S_1$, $S_2$, ..., and $S_T$ forming the sentence. The cross entropy loss function $L_{xe}$ may be further determined based on formula (1), which is shown in formula (2):

$$\log p(S \mid I) = \sum_{t=0}^{N} \log p(S_t \mid I, S_o, ..., S_{t1}; \theta), \tag{2}$$

where N is a quantity of words included in the generated text description, and $S_t$ is a word vector generated at a moment t.

In a training stage, (S, I) is a trained image sentence pair, and a sum of log probabilities in formula (2) may be optimized through a stochastic gradient descent (SGD) method.

Figure 10:
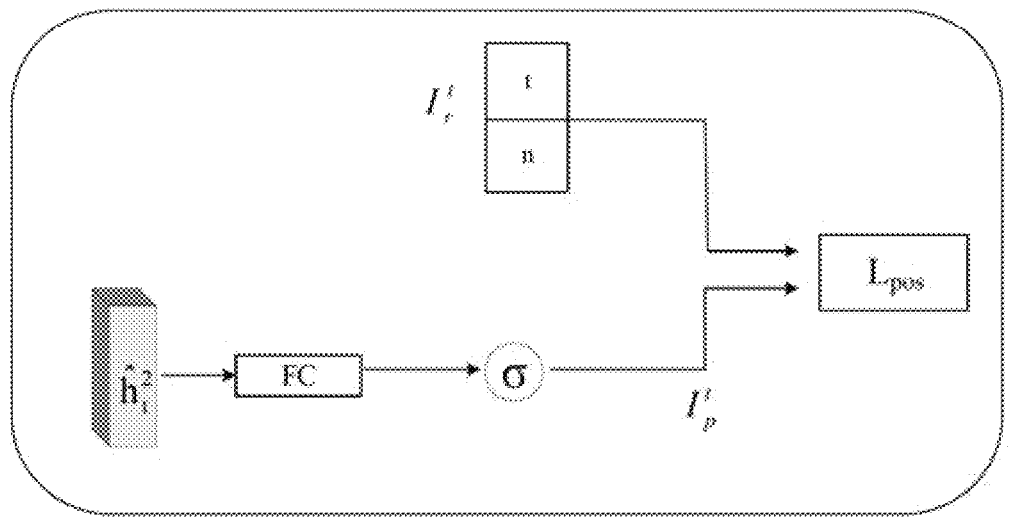
FIG. 10 is a schematic flowchart of a reflective position module determining a position-perceptive loss according to an embodiment of the present disclosure.

In an embodiment of the present disclosure, a position-perceptive loss may be determined by the reflective position module. FIG. 10 shows a schematic flowchart of a reflective position module determining a position-perceptive loss. As shown in FIG. 10, full connection may be performed, through the fully connected layer, on the third output information outputted by the reflective attention module to generate full connection information, and the full connection information may be a 1×1 vector. Compression processing is then performed on the full connection information according to a predetermined compression function corresponding to the compression layer, to obtain a predicted position of a word vector corresponding to the third output information, namely, a relative position $I_p^t$ of a predicted word vector in the text description. Finally, a position-perceptive loss is determined according to the predicted position and a real position of the word vector corresponding to the third output information in the text description sample. A real position $I_r^t$ of a word in a sentence may be obtained according to a quantity or words included in the text description sample and a position of a word corresponding to a target region feature in the text description sample, the position-perceptive loss $L_{pos}$ may be further determined according to the real position $I_r^t$ and the relative position $I_p^t$, and a specific calculation manner is shown in formula (3):

$$L_{pos} = \sum_{t=1}^{T} \|I_r^t - I_p^t\|^2, \tag{3}$$

where $I_r^t$ and $I_p^t$ respectively represent a real position and a predicted relative position of a word vector at a current moment in a sentence, and a distance between the two positions is reduced by minimizing $L_{pos}$.

Further, after a cross entropy loss and the position-perceptive loss are obtained, a size of the loss function corresponding to the reflective decoding network model may be determined according to formula (4), specifically:

$$L = L_{pos} + \lambda L_{pos} \tag{4},$$

where the parameter λ is used for balancing an effect of the loss function in the entire optimization process of the reflective decoding network model, may be set according to an actual requirement, and is not specifically limited in the embodiments of the present disclosure.

Next, the technical solutions in the embodiments of the present disclosure are described using navigation for a blind person as an example. A person with visual impairment may wear a smart device, and the smart device may be specifically smart glasses, a portable smart camera, or the like. In a movement process of the person with visual impairment, an image of a road ahead may be acquired in real time, and the image is then analyzed by an image description generation apparatus carried in the smart device to obtain a corresponding text description. Further, the text description may be outputted using a corresponding voice output device, to enable the person with visual impairment to know road conditions in real time and avoid obstacles. For example, when the person with visual impairment walks to a crossroads and a red light is on, an image acquisition unit of the smart device may obtain an image including a signal light, a zebra crossing, and traffic conditions. A first image feature is obtained by encoding the signal light, the zebra crossing, and vehicles in the image; a second image feature is then determined according to a pixel average value of all pixels in the first image feature; the first image feature, the second image feature, and an initial word vector are then inputted into a reflective decoding network model, and text prediction is performed on the signal light, the zebra crossing, and the vehicles in the image sequentially using reflective decoding subnetworks in the reflective decoding network model. For example, texts "signal light and red light" may be outputted according to the signal light, information such as "zebra crossing, there are vehicles, and there is no pedestrian" may be outputted according to the zebra crossing, and a text description "the signal light is a red light, there are vehicles on the zebra crossing, and pedestrians cannot pass" may be finally generated according to word vectors corresponding to image regions. The text description may be transmitted to the person with visual impairment in real time, to remind the person to wait for a green light and then pass.

Taking early childhood education as an example, when a child looks through a story book, the child may be attracted by various patterns, and when the child watches a picture, a photographing apparatus carried in the book may obtain the picture, and input the picture into an image processing unit to obtain a corresponding text description. In addition, a picture of each page in the story book may be stored in advance, and when a child watches a picture of one page, the picture of the page is inputted into the image processing unit to obtain a corresponding text description. For example, if a picture of one page in the story book shows one lamb eating grass on a hillside, the image processing unit may segment the picture and encode objects in image regions to obtain a first image feature; then calculate an average value of all pixels in the first image feature, and replace pixel values of all the pixels with the pixel average value to form a second image feature; and then input the first image feature, the second image feature, and an initial word vector into a reflective decoding network model, to generate a word at a current moment according to a context vector using the reflective decoding network model and predict a relative position of the word at the current moment in a sentence. For example, word vectors such as one, lamb, hillside, and eating grass may be generated sequentially using a reflective attention module, and a final text description of one lamb eating grass on a hillside may be obtained according to these word vectors. When a child watches the picture, the text description may be played through a voice output unit, to help the child to understand content of the picture and improve the child's cognition of things.

The image processing method in the present disclosure decodes, using the reflective decoding network model, the first image feature encoded by the encoding network model, performs matching between the hidden state at the current moment and the hidden states at the past moments using the reflective attention module to obtain a context vector to generate a word vector at the current moment, and predicts a relative position of the word vector at the current moment in the text description using the reflective position module, which enhances context association and sequential logic of a sentence, further improves the decoding capability of a language model, and ensures the stability of the model performance in a case that the sentence is relatively long or complex, thereby generating a more natural and accurate image text description.

Although this embodiment of the present disclosure mainly improves a decoding input part of a long short-term sequence module by introducing the reflective attention module and the reflective position module, other reinforcement learning, graph conventional neural network, and generative adversarial network technologies may be also improved using the reflective attention module and the reflective position module in the present disclosure, to further improve the image description generation quality.

The following describes apparatus embodiments of the present disclosure, and the apparatus embodiments may be used for performing the image processing method in the foregoing embodiments of the present disclosure. For details not disclosed in the apparatus embodiments of the present disclosure, refer to the foregoing embodiments of the image processing method of the present disclosure.

Figure 11:
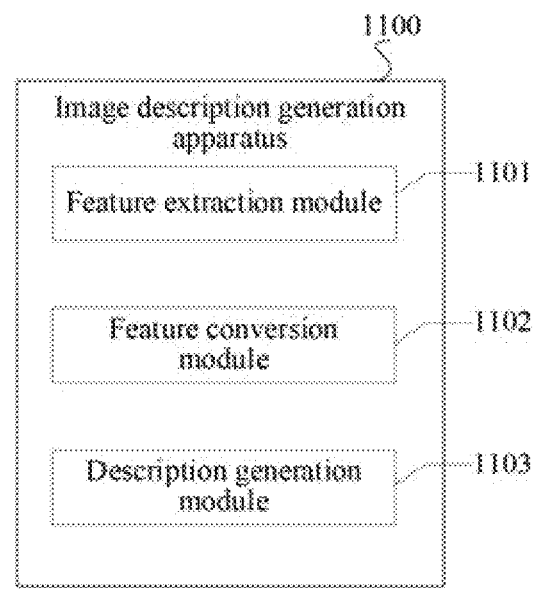
FIG. 11 is a block diagram of an image processing apparatus according to an embodiment of the present disclosure.

FIG. 11 is a block diagram of an image processing apparatus according to an embodiment of the present disclosure.

Referring to FIG. 11, an image processing apparatus 1100 according to an embodiment of the present disclosure includes: a feature extraction module 1101, a feature conversion module 1102, and a description generation module 1103.

The feature extraction module 1101 is configured to obtain an input image and encode objects included in image regions in the input image to obtain a first image feature. The feature conversion module 1102 is configured to process pixels in the first image feature according to a predetermined rule, and determine a second image feature according to the processed pixels. The description generation module 1103 is configured to decode, based on the second image feature and an initial word vector, region features corresponding to the image regions in the first image feature at different moments, to obtain word vectors corresponding to the image regions, and form a text description corresponding to the input image according to the word vectors, the initial word vector being an initial tag of the text description.

In an embodiment of the present disclosure, the feature extraction module 1101 is configured to: divide the input image to form the plurality of image regions; perform feature extraction on objects in the image regions using an encoding network model, to obtain region features corresponding to the image regions; and form the first image feature according to the region features.

In an embodiment of the present disclosure, the feature conversion module 1102 is configured to: obtain a pixel average value of all pixels in the first image feature, and use the pixel average value as pixel values of all the pixels, to form the second image feature.

In an embodiment of the present disclosure, the description generation module 1103 is configured to: decode, based on the second image feature and the initial word vector, the region features corresponding to the image regions in the first image feature at different moments using a reflective decoding network model, to obtain the word vectors corresponding to the image regions.

In an embodiment of the present disclosure, the reflective decoding network model includes a plurality of reflective decoding subnetworks arranged sequentially. The description generation module 1103 is configured to: input the second image feature and a word vector that is outputted by an $M^{th}$ reflective decoding subnetwork into an $(M+1)^{th}$ reflective decoding subnetwork; and decode a target region feature in the first image feature using the $(M+1)^{th}$ reflective decoding subnetwork, to obtain a word vector corresponding to the target region feature, where M is a positive integer.

In an embodiment of the present disclosure, the description generation module 1103 is configured to: input the second image feature and the initial word vector into a first reflective decoding subnetwork, and decode the target region feature in the first image feature using the first reflective decoding subnetwork, to obtain the word vector corresponding to the target region feature.

In an embodiment of the present disclosure, the reflective decoding subnetwork includes a visual attention module, a reflective attention module, and a reflective position module, where the reflective position module is configured to predict a relative position of a word vector outputted by the reflective decoding subnetwork at a current moment in the text description.

In an embodiment of the present disclosure, the visual attention module includes a first LSTM network, a second LSTM network, and an attention mechanism network. The image processing apparatus 1100 is configured to: multiply a word vector outputted by the reflective decoding subnetwork at a previous moment by a first weight matrix, to obtain a target word vector; perform feature extraction on the second image feature and the target word vector using the first LSTM network to obtain first output information; input the first output information and the first image feature into the attention mechanism network for visual matching, to obtain a target region feature; and perform feature extraction on the first output information and the target region feature using the second LSTM network, to obtain second output information.

In an embodiment of the present disclosure, the image processing apparatus 1100 further includes: a word vector generation module, configured to determine third output information corresponding to the target region feature at a current moment according to the second output information at past moments and the first output information and the second output information at the current moment using the reflective attention module.

In an embodiment of the present disclosure, the word vector generation module is configured to: determine a target matrix according to all the second output information at the past moments and the second output information at the current moment, perform dimension reduction on the target matrix to obtain first feature information, and perform dimension reduction on the first output information at the current moment to obtain second feature information, dimensions of the first feature information and dimensions of the second feature information being the same; add the first feature information to the second feature information based on an attention mechanism to obtain third feature information; perform weighting processing and normalization processing on the third feature information to obtain a second weight matrix; and multiply the first feature information by the second weight matrix and summate products of the multiplication, to obtain the third output information.

In an embodiment of the present disclosure, the description generation module 1103 is configured to: multiply the third output information by a third weight matrix, to obtain the word vector corresponding to the target region feature.

In an embodiment of the present disclosure, the image processing apparatus 1100 further includes: a sample obtaining module, configured to obtain an image sample and a text description sample corresponding to the image sample; a model training module, configured to train a reflective decoding network model according to the image sample and the text description sample until a loss function corresponding to the reflective decoding network model is minimized, the loss function including a cross entropy loss function and a position-perceptive loss function.

In an embodiment of the present disclosure, the cross entropy loss function is a correct probability of a text description generated by the reflective decoding network model and corresponding to the image sample; and the position-perceptive loss function is a distance between a real position and a predicted position of a word vector outputted by the reflective decoding network model at a current moment in the text description sample.

In an embodiment of the present disclosure, a position-perceptive toss corresponding to the position-perceptive loss function is determined by the reflective position module. The image processing apparatus 1100 is configured to: perform, through a fully connected layer, full connection on features outputted by the reflective attention module, to generate full connection information; compress the full connection information according to a predetermined compression function, to obtain information about predicted positions of word vectors corresponding to the features outputted by the reflective attention module; and determine the position-perceptive loss according to the information about the predicted positions and information about real positions of the word vectors corresponding to the features outputted by the reflective attention module in the text description sample.

Figure 12:
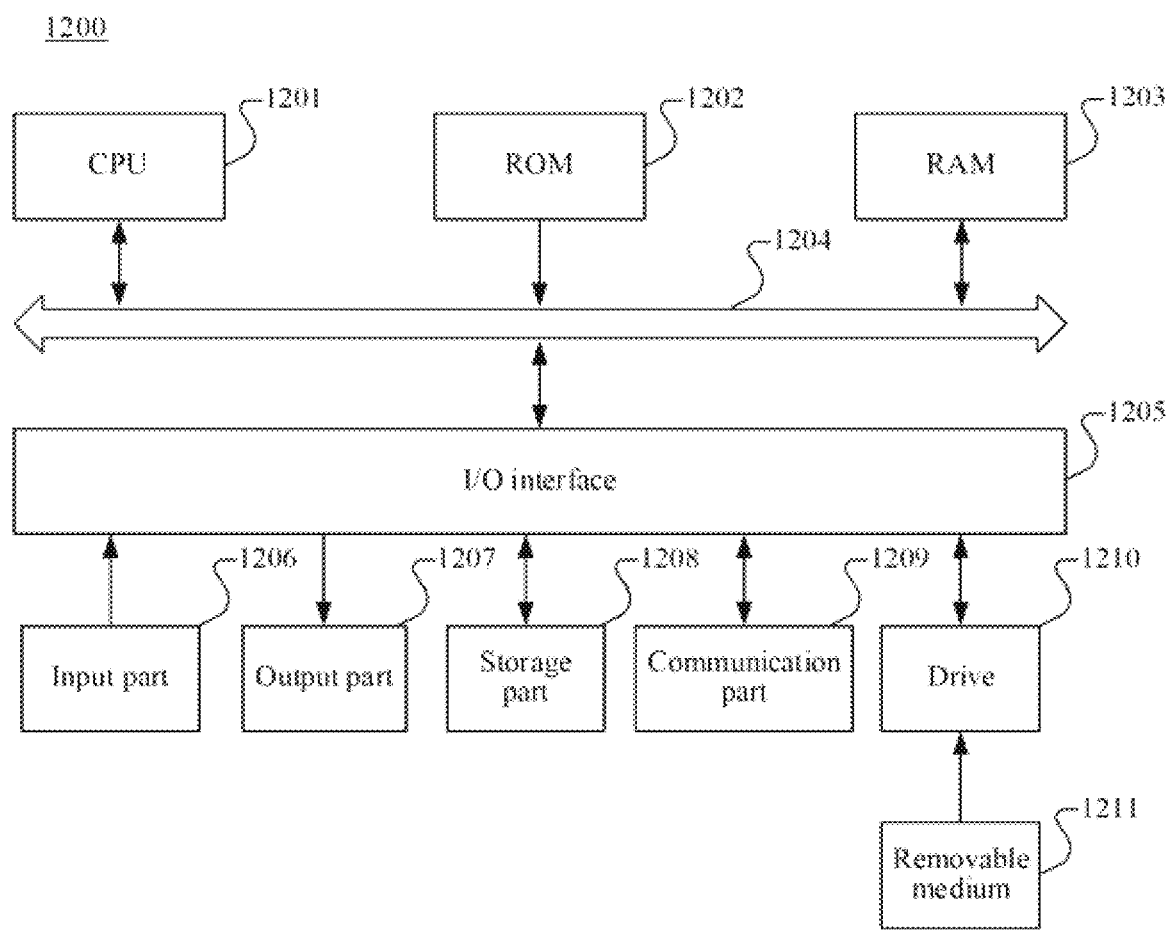
FIG. 12 is a schematic structural diagram of a computer system of an image processing apparatus adapted to implement an embodiment of the present disclosure.

FIG. 12 is a schematic structural diagram of a computer system of an electronic device adapted to implement an embodiment of the present disclosure.

The computer system 1200 of the electronic device shown in FIG. 12 is merely an example, and is not to impose any limitation on a function and use scope of the embodiments of the present disclosure.

As shown in FIG. 12, the computer system 1200 includes a central processing unit (CPU) 1201, which may perform various suitable actions and processing based on a program stored in a read-only memory (ROM) 1202 or a program loaded from a storage part 1208 into a random access memory (RAM) 1203, to implement the image processing method described in the foregoing embodiments. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like; an output part 1207 including a cathode ray tube (CRT), a liquid crystal display (LCD), a speaker, or the like; a storage part 1208 including a hard disk, or the like; and a communication part 1209 including a network interface card such as a local area network (LAN) card or a modem. The communication part 1209 performs communication processing using a network such as the Internet. A drive 1210 is also connected to the I/O interface 1205 as required. A removable medium 1211, such as a magnetic disk, an optical disc, a magneto-optical disk, or a semiconductor memory, is installed on the drive 1210 as required, so that a computer program read from the removable medium is installed into the storage part 1208 as required.

Particularly, according to an embodiment of the present disclosure, the processes described below by referring to the flowcharts may be implemented as computer software programs. For example, the embodiments of the present disclosure include a computer program product, including a computer program carried on a computer-readable medium. The computer program includes program code for performing the method shown in the flowchart. In such an embodiment, using the communication part 1209, the computer program may be downloaded and installed from a network, and/or installed from the removable medium 1211. When the computer program is executed by the CPU 1201, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a RAM, a ROM, an erasable programmable ROM (EPROM), a flash memory, an optical fiber, a compact disk ROM (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal included in a baseband or propagated as a part of a carrier, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted using any suitable medium, including but not limited to: a wireless medium, a wire, or the like, or any suitable combination thereof.

Flowcharts and block diagrams in the drawings illustrate architectures, functions, and operations that may be implemented using the system, the method, and the computer program product according to the various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented using a dedicated hardware-based system configured to perform a specified function or operation, or may be implemented using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in a specific case.

As another aspect, the present disclosure further provides a computer-readable medium. The computer-readable medium may be the computer-readable medium included in the image processing apparatus described in the foregoing embodiments, or a stand-alone computer-readable medium not assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. In practice, according to the implementations of the present disclosure, the features and functions of two or more modules or units described above may be embodied in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented using software, or may be implemented by combining software and necessary hardware. Therefore, the technical solutions according to the implementations of the present disclosure may be implemented in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the implementations of the present disclosure.

After considering the specification and practicing the present disclosure, a person skilled in the art can easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the art.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. An image processing method, performed by a computing device, the method comprising:
    obtaining an input image and extracting region features of image regions in the input image to obtain a first image feature;
    processing pixels in the first image feature according to a predetermined rule and determining a second image feature according to the processed pixels;
    determining, based on the second image feature and at least one word vector that is determined for the input image, word vectors corresponding to the region features of the image regions in the first image feature at different moments; and
    predicting positions of the word vectors in a text description and forming the text description corresponding to the input image according to the word vectors and the positions.

2. The method of claim 1, wherein extracting the region features of the image regions in the input image to obtain the first image feature comprises:
    dividing the input image to form the image regions;
    performing feature extraction on objects in the image regions using an encoding network model, to obtain region features corresponding to the objects in the image regions; and
    forming the first image feature according to the region features.

3. The method of claim 1, wherein determining the word vectors corresponding to the region features of the image regions in the first image feature at different moments comprises:
    determining, based on the second image feature and the at least one word vector, the word vectors corresponding to the region features of the image regions in the first image feature at the different moments using a reflective decoding network model.

4. The method of claim 3, wherein the determining the word vectors corresponding to the region features of the image regions in the first image feature at the different moments using the reflective decoding network model comprises:
    inputting the second image feature and an initial word vector into a first reflective decoding subnetwork; and determining a word vector corresponding to a target region feature in the first image feature based on the second image feature and the initial word vector using the first reflective decoding subnetwork, the initial word vector being an initial tag of the text description.

5. The method of claim 3, wherein the reflective decoding network model comprises a plurality of reflective decoding subnetworks arranged sequentially, and determining the word vectors corresponding to the region features of the image regions in the first image feature at the different moments using the reflective decoding network model comprises:

inputting the second image feature and a word vector that is outputted by an $M^{th}$ reflective decoding subnetwork into an $(M+1)^{th}$ reflective decoding subnetwork; and determining a word vector corresponding to a target region feature in the first image feature using the $(M+1)^{th}$ reflective decoding subnetwork, M being a positive integer.

6. The method of claim 5, wherein the reflective decoding subnetwork comprises a reflective position module and the method further comprises:

predicting, with the reflective position module, a relative position of a word vector outputted by the reflective decoding subnetwork at a current moment in the text description.

7. The method of claim 6, wherein the reflective decoding subnetwork further comprises a visual attention module, the visual attention module comprises a first long short-term memory (LSTM) network, a second LSTM network, and an attention mechanism network, and determining the word vector corresponding to the target region feature in the first image feature using the $(M+1)^{th}$ reflective decoding subnetwork comprises:

multiplying a word vector outputted by the $(M+1)^{th}$ reflective decoding subnetwork at a previous moment by a first weight matrix, to obtain a target word vector;

performing feature extraction on the second image feature and the target word vector using the first LSTM network, to determine a first hidden state of the first LSTM network;

inputting the first hidden state and the first image feature into the attention mechanism network for visual matching, to obtain the target region feature;

performing feature extraction on the first hidden state and the target region feature using the second LSTM network, to determine a second hidden state of the second LSTM network; and determining the word vector corresponding to the target region feature according to the first hidden state and the second hidden state.

8. The method of claim 7, wherein the reflective decoding subnetwork further comprises a reflective attention module, and determining the word vector corresponding to the target region feature according to the first hidden state and the second hidden state comprises:

determining output information corresponding to the target region feature at a current moment according to a second hidden state at a past moment and the first hidden state and the second hidden state at the current moment using the reflective attention module; and multiplying the output information by a third weight matrix, to obtain the word vector corresponding to the target region feature.

9. The method of claim 8, wherein determining the output information corresponding to the target region feature at the current moment comprises:

determining a target matrix according to all second hidden states at past moments and the second hidden state at the current moment;

performing dimension reduction on the target matrix to obtain first feature information;

performing dimension reduction on the first hidden state at the current moment to obtain second feature information, dimensions of the first feature information and dimensions of the second feature information being the same;

adding the first feature information to the second feature information based on an attention mechanism to obtain third feature information;

performing weighting processing and normalization processing on the third feature information to obtain a second weight matrix; and multiplying the first feature information by the second weight matrix and summating products of the multiplication, to obtain the output information.

10. The method of claim 9, wherein the method further comprises:

obtaining an image sample and a text description sample corresponding to the image sample; and training a reflective decoding network model according to the image sample and the text description sample until a loss function corresponding to the reflective decoding network model is minimized, the loss function comprising a cross entropy loss function and a position-perceptive loss function.

11. The method of claim 10, wherein the cross entropy loss function is a correct probability of a text description generated by the reflective decoding network model and corresponding to the image sample, and the position-perceptive loss function is a distance between a real position and a predicted position of a word vector outputted by the reflective decoding network model at a current moment in the text description sample.

12. The method of claim 11, wherein a position-perceptive loss corresponding to the position-perceptive loss function is determined by a reflective position module, and the method further comprises:

performing, via a fully connected layer, full connection on features outputted by the reflective attention module, to generate full connection information;

compressing the full connection information according to a predetermined compression function, to obtain predicted positions of word vectors corresponding to the features outputted by the reflective attention module; and determining the position-perceptive loss according to the predicted positions and real positions of the word vectors corresponding to the features outputted by the reflective attention module in the text description sample.

13. An image processing apparatus, comprising:

a memory operable to store computer-readable instructions; and a processor operable to read the computer-readable instructions, the processor when executing the computer-readable instructions is configured to:

obtain an input image and extract region features of image regions in the input image to obtain a first image feature;

process pixels in the first image feature according to a predetermined rule and determine a second image feature according to the processed pixels;

determine, based on the second image feature and at least one word vector that is determined for the input image, word vectors corresponding to the region features of the image regions in the first image feature at different moments; and predict positions of the word vectors in a text description and form the text description corresponding to the input image according to the word vectors and the positions.

14. The apparatus of claim 13, wherein the processor is configured to:

divide the input image to form the image regions;

perform feature extraction on objects in the image regions using an encoding network model, to obtain region features corresponding to the objects in the image regions; and form the first image feature according to the region features.

15. The apparatus of claim 13, wherein the processor is configured to:

determine, based on the second image feature and the at least one word vector, the word vectors corresponding to the region features of the image regions in the first image feature at the different moments using a reflective decoding network model.

16. The apparatus of claim 15, wherein the reflective decoding network model comprises a plurality of reflective decoding subnetworks arranged sequentially, and the processor is configured to:

input the second image feature and a word vector that is outputted by an $M^{th}$ reflective decoding subnetwork into an $(M+1)^{th}$ reflective decoding subnetwork; and determine a word vector corresponding to a target region feature in the first image feature using the $(M+1)^{th}$ reflective decoding subnetwork, M being a positive integer.

17. The apparatus of claim 16, wherein the reflective decoding subnetwork comprises a reflective position module and the processor is further configured to:

predict, with the reflective position module, a relative position of a word vector outputted by the reflective decoding subnetwork at a current moment in the text description.

18. The apparatus of claim 17, wherein the reflective decoding subnetwork further comprises a visual attention module, the visual attention module comprises a first long short-term memory (LSTM) network, a second LSTM network, and an attention mechanism network, and the processor is configured to:

multiply a word vector outputted by the $(M+1)^{th}$ reflective decoding subnetwork at a previous moment by a first weight matrix, to obtain a target word vector;

perform feature extraction on the second image feature and the target word vector using the first LSTM network, to determine a first hidden state of the first LSTM network;

input the first hidden state and the first image feature into the attention mechanism network for visual matching, to obtain the target region feature;

perform feature extraction on the first hidden state and the target region feature using the second LSTM network, to determine a second hidden state of the second LSTM network; and determine the word vector corresponding to the target region feature according to the first hidden state and the second hidden state.

19. The apparatus of claim 18, wherein the reflective decoding subnetwork further comprises a reflective attention module, and the processor is configured to:

determine output information corresponding to the target region feature at a current moment according to a second hidden state at a past moment and the first hidden state and the second hidden state at the current moment using the reflective attention module; and multiply the output information by a third weight matrix, to obtain the word vector corresponding to the target region feature.

20. A non-transitory computer-readable storage medium, having processor executable instructions stored thereon for causing a processor to:

obtain an input image and extract region features of image regions in the input image to obtain a first image feature;

process pixels in the first image feature according to a predetermined rule and determine a second image feature according to the processed pixels;

determine, based on the second image feature and at least one word vector that is determined for the input image, word vectors corresponding to the region features of the image regions in the first image feature at different moments; and predict positions of the word vectors in a text description and form the text description corresponding to the input image according to the word vectors and the positions.

\* \* \* \* \*